United States Patent
Lee et al.

(10) Patent No.: US 11,225,182 B2
(45) Date of Patent: Jan. 18, 2022

(54) CONSOLE APPARATUS WITH VARIABLE TABLE

(71) Applicants: Hyundai Motor Company, Seoul (KR); Kia Motors Corporation, Seoul (KR); Ecoplastic Corporation, Gyeongsangbuk-do (KR)

(72) Inventors: Young Ju Lee, Gyeonggi-do (KR); Eun Sue Kim, Gyeonggi-do (KR); Dong Jin Park, Daegu (KR)

(73) Assignees: Hyundai Motor Company, Seoul (KR); Kia Motors Corporation, Seoul (KR); Ecoplastic Corporation, Gyeongsangbuk-do (KR)

( * ) Notice: Subject to any disclaimer, the term of this patent is extended or adjusted under 35 U.S.C. 154(b) by 0 days.

(21) Appl. No.: 16/101,464

(22) Filed: Aug. 12, 2018

(65) Prior Publication Data
US 2019/0315259 A1    Oct. 17, 2019

(30) Foreign Application Priority Data
Apr. 12, 2018 (KR) .......................... 10-2018-0042978

(51) Int. Cl.
  *B60N 3/00* (2006.01)
  *B60N 3/10* (2006.01)
  *B60R 7/04* (2006.01)

(52) U.S. Cl.
  CPC .............. *B60N 3/002* (2013.01); *B60N 3/102* (2013.01); *B60R 7/04* (2013.01)

(58) Field of Classification Search
  CPC .......... B60N 3/002; B60N 3/102; B60R 7/04; A47B 5/006; A47B 3/00; B64D 11/0638

USPC ....... 108/144.11, 146, 147, 47, 48, 129–133, 108/160
  See application file for complete search history.

(56) References Cited

U.S. PATENT DOCUMENTS

| | | | | | |
|---|---|---|---|---|---|
| 1,319,011 | A | * | 10/1919 | Kuretich | ................. E05C 9/043 292/36 |
| 1,745,998 | A | * | 2/1930 | Kovats | ................. A47B 3/0916 108/126 |
| 4,651,652 | A | * | 3/1987 | Wyckoff | .................. A47B 9/12 108/147 |
| 4,751,884 | A | * | 6/1988 | Ball | ......................... A47B 9/12 108/143 |
| 4,892,338 | A | * | 1/1990 | Weinerman | ............. E05C 9/046 292/166 |

(Continued)

FOREIGN PATENT DOCUMENTS

| CN | 105644393 A |   | 6/2016 |
|---|---|---|---|
| DE | 198 22 694 | * | 11/1999 |

(Continued)

*Primary Examiner* — Daniel J Troy
*Assistant Examiner* — Timothy M Ayres
(74) *Attorney, Agent, or Firm* — Mintz Levin Cohn Ferris Glovsky and Popeo, P.C.; Peter F. Corless

(57) ABSTRACT

A console apparatus with a variable table provided in a vehicle can include: a housing having an inner space with an open upper portion; a support configured to be vertically movable in the inner space of the housing; a table part rotatably connected to an upper end of the support; and a lifting part disposed in the housing and configured to fix a position of the support or adjust a speed of the support when the support is moved up or down.

13 Claims, 14 Drawing Sheets

(56) References Cited

U.S. PATENT DOCUMENTS

| | | | | |
|---|---|---|---|---|
| 5,054,162 | A * | 10/1991 | Rogers | E05D 13/1276 16/193 |
| 5,246,272 | A * | 9/1993 | Kato | B62B 9/104 297/354.12 |
| 5,577,452 | A * | 11/1996 | Yindra | A47B 5/06 108/168 |
| 5,797,331 | A * | 8/1998 | Watt | A47B 9/02 108/146 |
| 5,797,666 | A * | 8/1998 | Park | A47B 21/0073 312/223.3 |
| 6,347,590 | B1 * | 2/2002 | D'Annunzio | B60N 3/002 108/25 |
| 6,520,091 | B1 * | 2/2003 | Dettmers | A47B 5/006 108/42 |
| 7,073,220 | B2 * | 7/2006 | Simmonds | A47C 19/045 292/36 |
| 7,721,657 | B2 * | 5/2010 | Carstensen | A47B 5/006 108/134 |
| 8,205,563 | B2 * | 6/2012 | St. Louis | B64D 11/00 108/40 |
| 8,695,513 | B2 * | 4/2014 | Figueras Mitjans | A47B 5/006 108/115 |
| 9,102,410 | B2 * | 8/2015 | Frost | B64D 11/06 |
| 9,150,129 | B2 * | 10/2015 | Suhre | B64D 11/06 |
| 9,481,464 | B2 * | 11/2016 | Gow | B64D 11/0605 |
| 9,955,779 | B2 * | 5/2018 | Hoeftberger | B60N 3/004 |
| 10,070,717 | B2 * | 9/2018 | De Saulles | A47B 3/00 |
| 10,137,990 | B2 * | 11/2018 | Lee | B64D 11/0638 |
| 2016/0103512 | A1 | 4/2016 | Edgren | |
| 2017/0318957 | A1 * | 11/2017 | Hoeftberger | B60N 3/004 |
| 2017/0369173 | A1 * | 12/2017 | Lee | B64D 11/0638 |
| 2018/0251057 | A1 * | 9/2018 | Bywaters | B60N 3/001 |

FOREIGN PATENT DOCUMENTS

| | | |
|---|---|---|
| DE | 102014224560 A1 | 6/2016 |
| JP | 2007-516117 A | 6/2007 |
| JP | 2007-190996 A | 8/2007 |
| JP | 2015-131531 A | 7/2015 |

* cited by examiner

CONSOLE APPARATUS WITH VARIABLE TABLE

CROSS-REFERENCE TO RELATED APPLICATION

The present application claims the benefit of priority to Korean Patent Application No. 10-2018-0042978, filed on Apr. 12, 2018 in the Korean Intellectual Property Office (KIPO), the entire contents of which are incorporated herein by reference.

BACKGROUND OF THE DISCLOSURE

Technical Field

The present disclosure relates generally to a console apparatus with a variable table. More particularly, the present disclosure relates to a console apparatus with a variable table provided in a vehicle.

Description of the Related Art

An autonomous vehicle is a "smart" vehicle equipped with autonomous driving technology that allows a driver to reach a destination without having to manually operate components of the vehicle such as the steering wheel, accelerator pedal, brakes, and so forth. Recently, the development of autonomous driving technology has advanced rapidly.

As autonomous driving becomes universally implemented, passengers increasingly desire to rest comfortably in the vehicle as it travels. For example, the front seats (i.e., the driver seat and front passenger seat) can be moved to the desired position or even turned around to face the rear.

In conventional vehicles, a console box is fixedly positioned between the driver seat and the front passenger seat. A fixed console structure is problematic in an autonomous vehicle, however, since space utilization is important.

Meanwhile, for the convenience of passengers, some vehicles provide a table for each seat so that display devices or other objects can be placed thereon. However, the structural rigidity thereof is insufficient and space utilization is reduced once again. Therefore, there is a growing demand for a variable table that is both structurally robust and highly space-efficient.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art. The present disclosure proposes a console apparatus with a variable table, wherein the console apparatus is able to be accommodated in a console box.

In order to achieve the above object, according to embodiments of the present disclosure, a console apparatus with a variable table provided in a vehicle can include: a housing having an inner space with an open upper portion; a support configured to be vertically movable in the inner space of the housing; a table part rotatably connected to an upper end of the support; and a lifting part disposed in the housing and configured to fix a position of the support or adjust a speed of the support when the support is moved up or down.

The lifting part may include: a wire connected to the support; and a wire roll disposed in the inner space of the housing and configured to allow the wire to be wound therearound and to provide a tensile force to the wire. When the support is moved up, the wire can wind around the wire roll, and when the support is moved down, the wire can release from the wire roll.

The lifting part may further include a pulley roll disposed at an upper portion of the inner space of the housing and configured to support the wire when the wire is bent, the wire roll may be disposed at a lower portion of the inner space of the housing, and the wire may be connected to a lower portion of the support.

The wire roll may include: a shaft connected to the housing; a holder rotatably coupled to the shaft and configured such that the wire is wound around an outer circumferential surface thereof; and an elastic body configured to press the holder in a winding direction of the wire.

The elastic body may be a spiral spring.

The lifting part may further include a rack gear vertically disposed in the inner space of the housing, and the support may be provided with a reducer engaged with the rack gear and be configured to adjust an ascent speed and a descent speed of the support.

The support may include a locking pin disposed at a lower end thereof, and the locking pin may be reversibly coupled to a casing in a push-latch structure, the being disposed at a lower portion of the inner space of the housing.

The locking pin may include a main body rotatably coupled to the support and further include a pin locked to the main body and inserted into the casing.

The console apparatus may further include a rail vertically disposed in the inner space of the housing, including an insertion groove disposed at an upper end portion of the rail, and configured to guide an ascent and a descent of the support. The table part can include: a table board hinged to the upper end of the support; a first link having an upper end hinged to the table board and a lower end vertically movably coupled to the support, and configured to move up or down according to a rotation of the table part; a second link formed in an L-shape and having a center portion rotatably coupled to the support and a first end rotatably connected to the first link; and a locking bar rotatably coupled to a second end of the second link and configured to protrude toward opposite sides of the support according to a rotation of the second link so as to be inserted into the insertion groove of the rail.

The console apparatus may further include a lifting rail disposed in the support and configured to constrain the lower end of the first link, wherein a lower end of the support is constrained in the lifting rail such that an elevation range of the support is limited.

The table part may further include a link load rotatably coupled to the lower end of the first link, the second link may be foiled with a slot-shaped hole at each of opposite ends thereof, the link load is engaged with a first hole famed in the first end of the second link, and the locking bar may be engaged with a second hole formed in the second end of the second link.

The console apparatus may further include a limit sensor disposed in a lower end portion of the rail. The limit sensor can be configured to sense the position of the support by selectively coming into contact with the support.

The table board may include a sliding rail disposed on a lower surface thereof, and the table part may further include: a first support link having an upper end hinged to the sliding rail to be rotatably slidable and a lower end hinged to the support; and a second support link configured to mediate between a center portion of the first support link and the support.

The first support link and the support may be hinged to each other at a location higher than a location where the second link and the support are hinged to each other.

The center portion of the first support link may be open, an upper end of the second support link may be inserted into the open center portion of the first support link, and the first support link and the second support link may be hinged to each other.

The console apparatus with a variable table of a vehicle according to the present disclosure has the following advantages.

First, the robust supporting structure of the table provides for enhanced rigidity of the table.

Second, since the table can be stowed away in the console apparatus during non-use, space utilization in the vehicle can increase.

Third, since the table is disposed between the front and rear rows of the vehicle, all vehicle occupants can use the table.

Fourth, by detecting the state of table use, damage caused to the table can be prevented.

BRIEF DESCRIPTION OF THE DRAWINGS

The above and other objects, features and other advantages of the present disclosure will be more clearly understood from the following detailed description when taken in conjunction with the accompanying drawings, in which.

Figure 1:
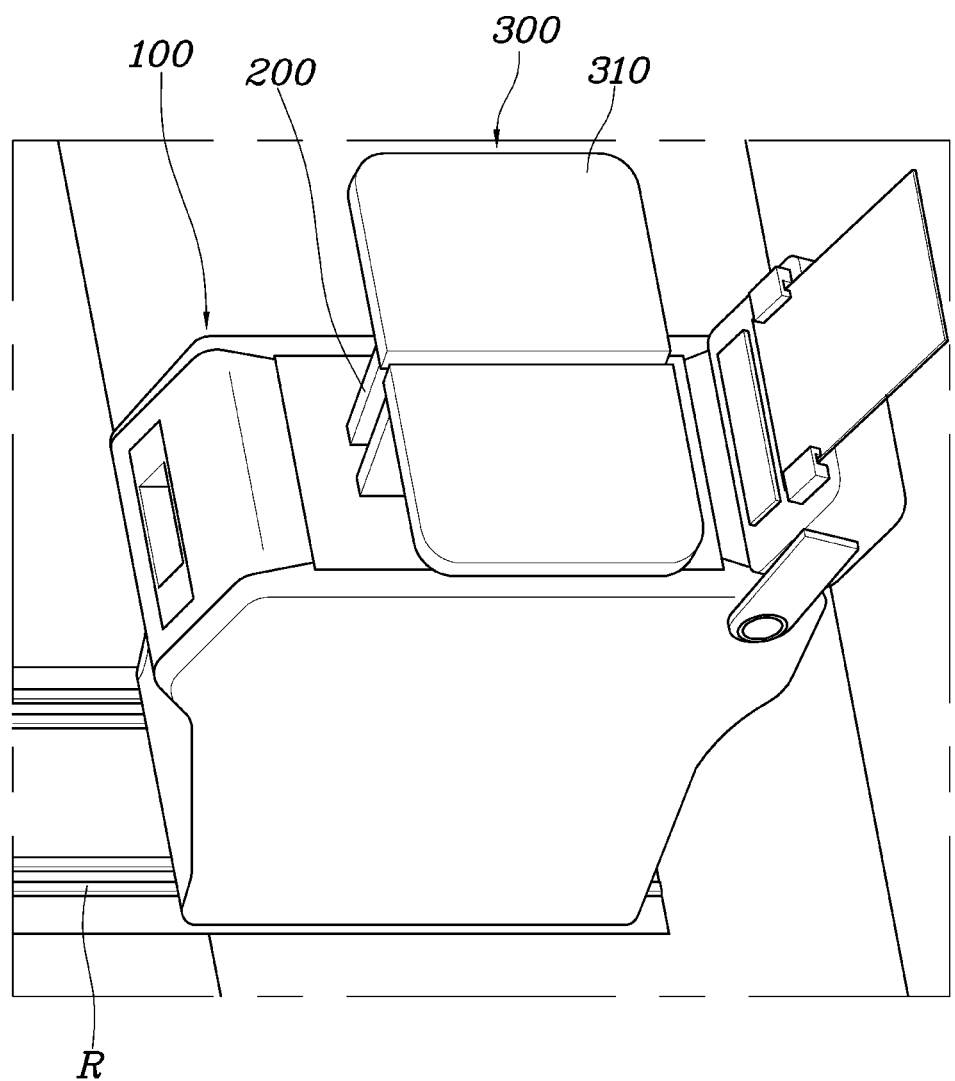
FIG. 1 is an entire perspective view showing a console apparatus with a variable table according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinbelow, a console apparatus with a variable table according to embodiments of the present disclosure will be described in more detail with reference to the accompanying drawings.

Figure 2:
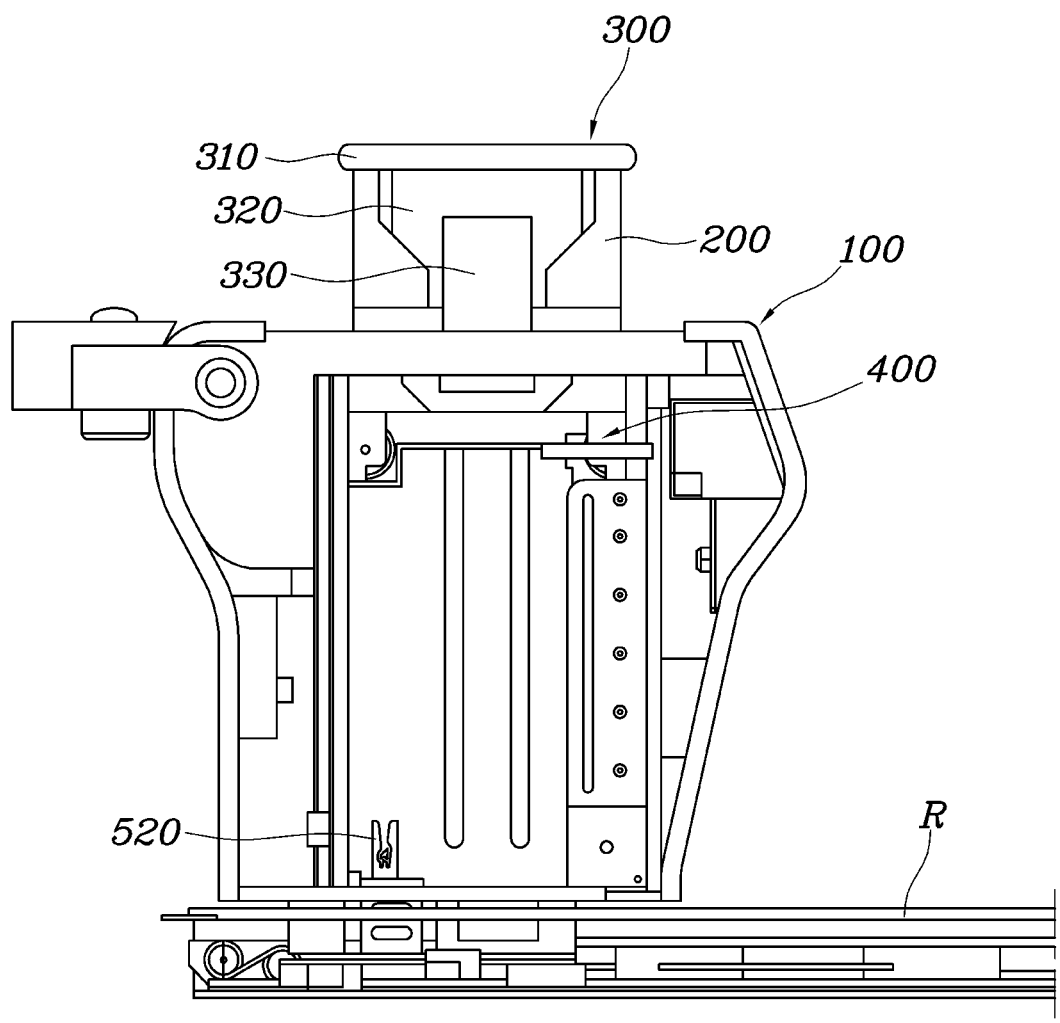
FIG. 2 is a side sectional view showing the console apparatus with a variable table.
Figure 3:
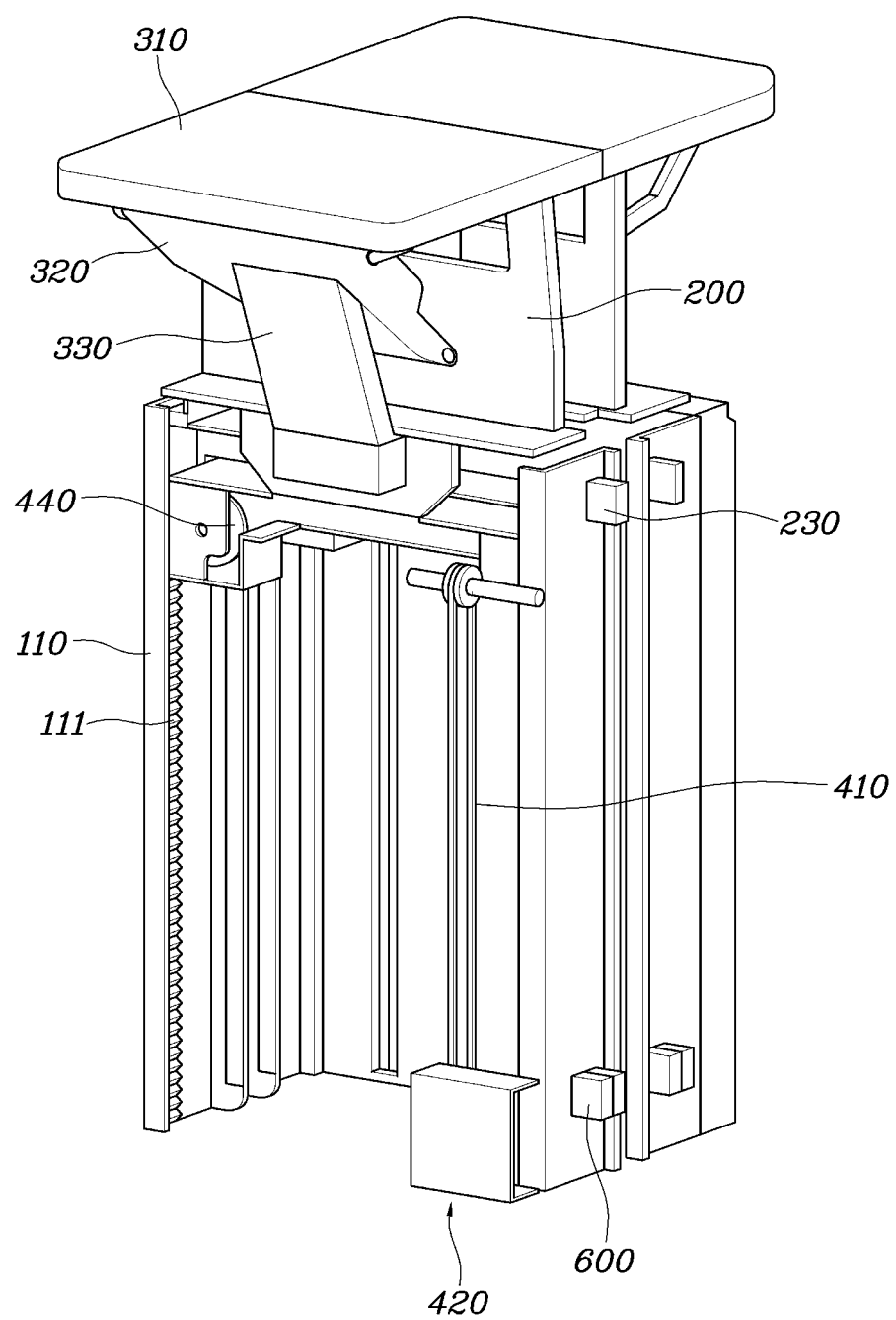
FIG. 3 is a perspective view showing an internal structure of the console apparatus with a variable table.
Figure 4:
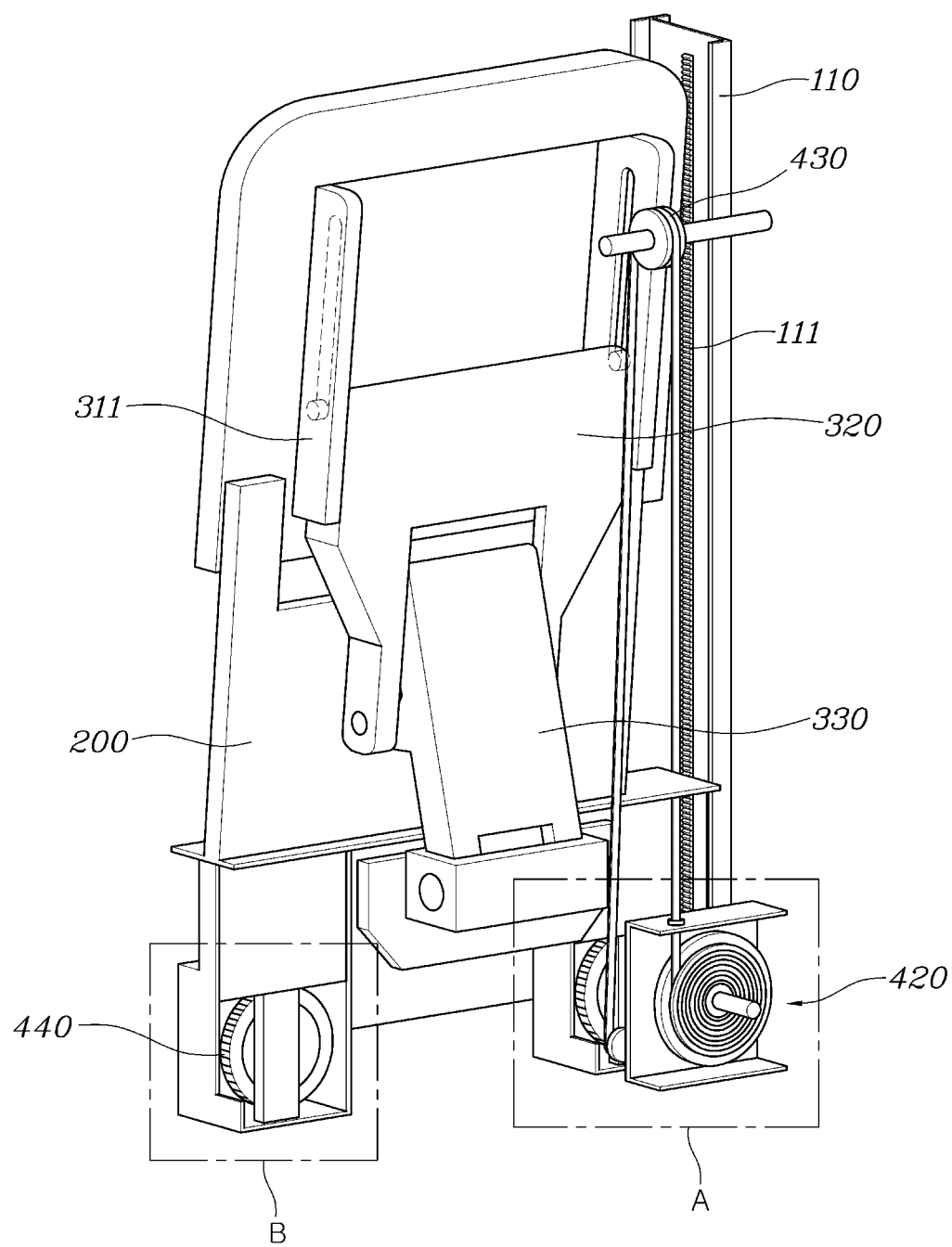
FIGS. 4 and 5 are partial perspective views showing a support, a table part, and a lifting part.
Figure 5:
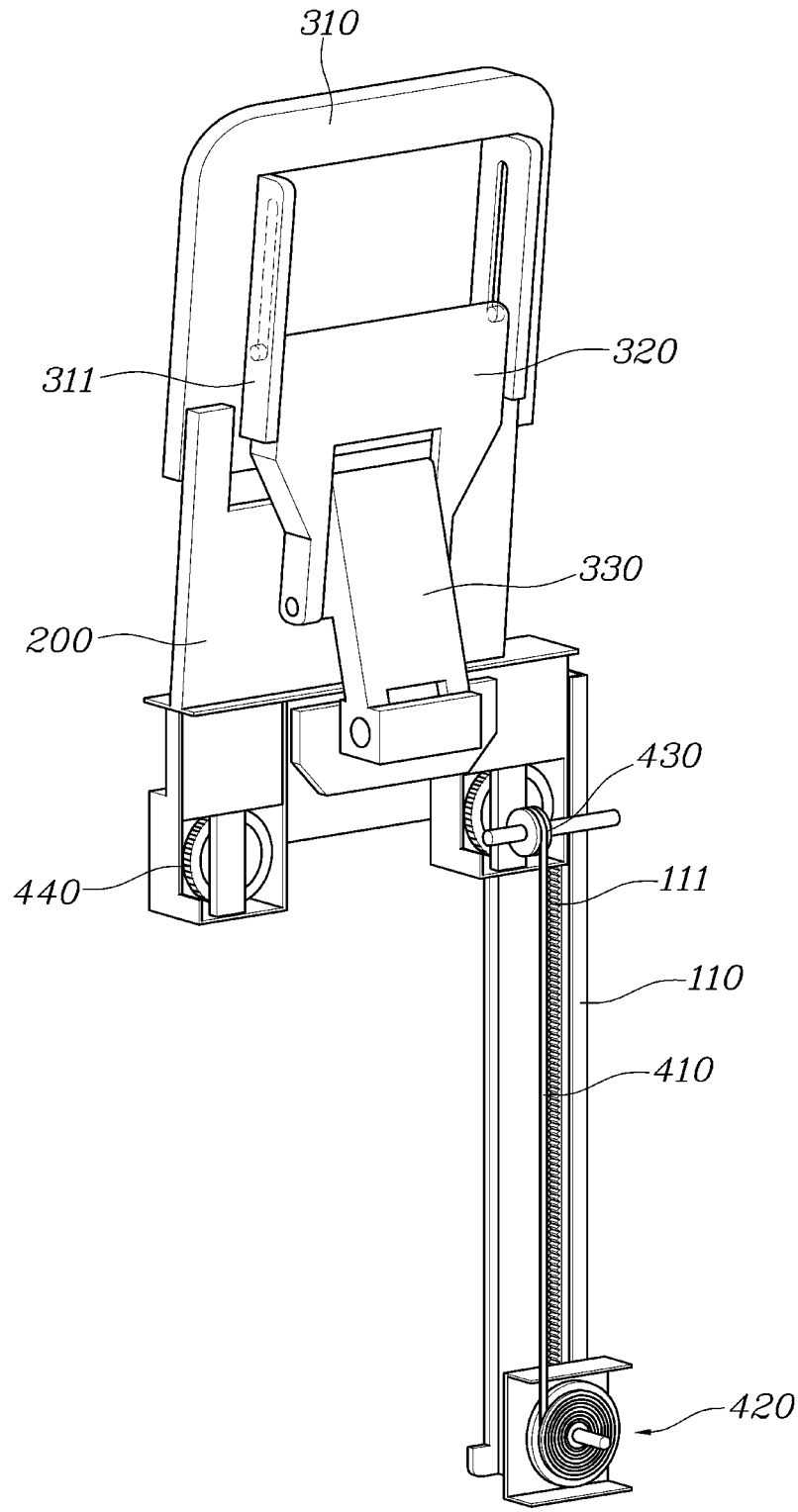

FIG. 1 is an entire perspective view showing a console apparatus with a variable table according to embodiments of the present disclosure; FIG. 2 is a side sectional view showing the console apparatus with a variable table; FIG. 3 is a perspective view showing an internal structure of the console apparatus with a variable table; and FIGS. 4 and 5 are partial perspective views showing a support, a table part, and a lifting part.

As shown in FIGS. 1 to 5, a console apparatus with a variable table according to embodiments of the present disclosure includes: a housing 100 having an inner space with an upper portion thereof being open; a support 200 provided to be vertically movable in the inner space of the housing 100; a table part 300 rotatably connected to an upper end of the support 200; and a lifting part 400 provided in the housing 100 and configured to fix a position of the support 200 or adjust speed when the support 200 is moved up and down.

The housing 100 may be disposed at a location corresponding to a storage space of a conventional console apparatus in a vehicle (e.g., between the driver seat and front passenger seat), and may be foiled in a box-like shape having a hollow interior with an upper portion thereof being open. The specific mounting position or shape of the housing 100 may be changed depending on the vehicle structure or the inner space layout, so that it is not particularly limited here.

Meanwhile, the entire console apparatus including the housing 100 can be moved in the forward and backward directions of the vehicle along a rail R provided at the lower portion of the housing 100. This is applied to move the console apparatus down the crash board to prevent interference when the driver and passenger seats are rotated in the backward direction or to move the console apparatus backward to facilitate use by the rear seat occupant. As will be discussed in more detail below, the movement of the console apparatus may be limited when using a table.

The support 200, which is a kind of column structure for supporting the table part 300 to be described below, is accommodated in the inner space of the housing 100 or is disposed so as to move vertically and protrude above the housing 100.

It is preferred that the support 200 is formed in a planar shape corresponding to the shape of the inner space of the housing 100, but the shape thereof is not particularly limited as long as it can support the table part 300 without interference with the housing 100 when being moved up or down.

The lifting part 400 may include a wire 410 and a wire roll 420 to assist with ascent and descent of the support 200, and may further include a pulley roll 430, a rack gear 111, and the like.

The wire 410 is connected to the support 200 to transmit a lifting force when the support 200 is moved up or a tensile force when the support 200 is moved down so as to reduce the descent speed.

Figure 6:
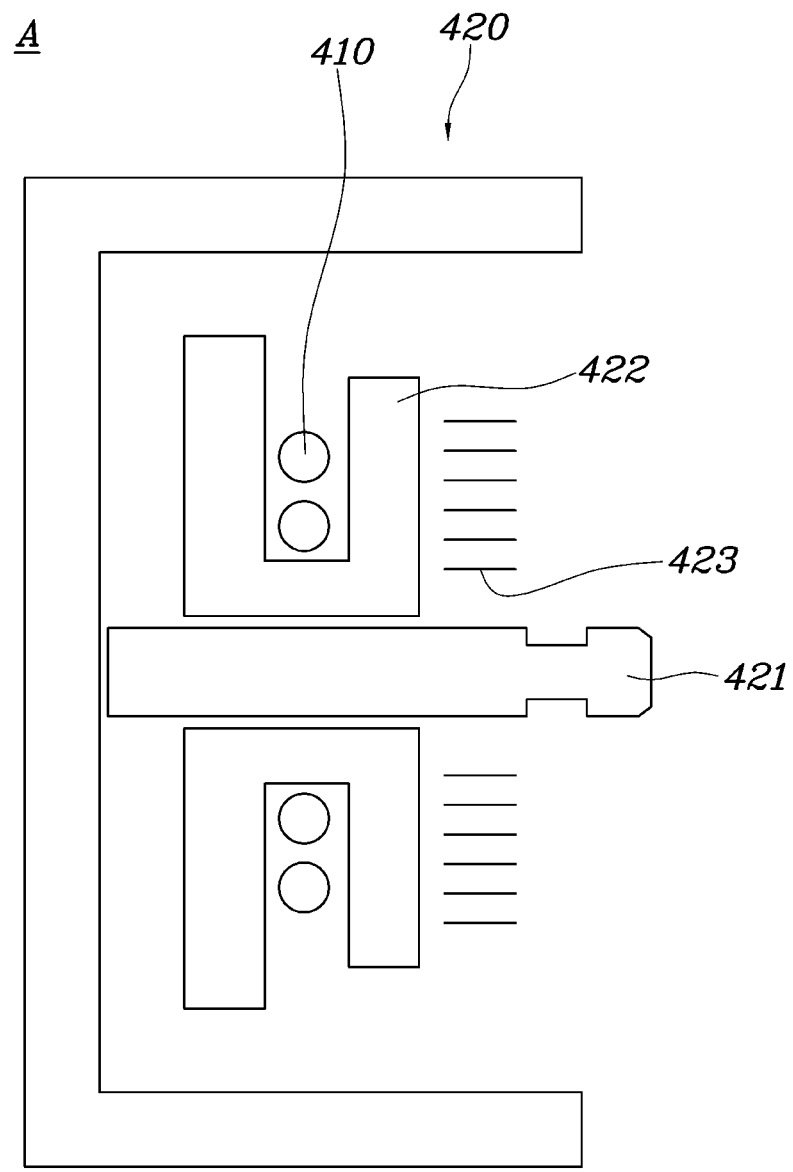
FIG. 6 is a view showing portion A of FIG. 4.

FIG. 6 is a side sectional view showing the wire roll 420. As shown in FIGS. 4 and 6, the wire roll 420 is provided in the inner space of the housing 100 to allow the wire 410 to be wound therearound, and provides a tensile force to the wire 410 by continuously applying a force in the winding direction of the wire 410.

In other words, when the support 200 is moved up, the wire 410 is wound around the wire roll 420 to help the support 200 to be moved up easily, and when the support 200 is moved down, the wire 410 is released from the wire roll 420 to prevent the support 200 from being moved down excessively rapidly.

To be more specific, the wire roll 420 may include: a shaft 421 connected to the housing 100; a holder 422 rotatably coupled to the shaft 421 and configured such that an end of the wire 410 is coupled to an outer circumferential surface thereof; and an elastic body 423 configured to give a force such that the holder 422 is rotated in the winding direction of the wire 410.

This allows the wire roll 420 to continuously apply a tensile force in the winding direction of the wire 410. Here, the elastic body 423 may be, for example, a spiral spring. Accordingly, the elastic force can be saved when the wire 410 is released from the wire roll 420 and the elastic force can be relieved as the wire 410 is wound around the wire roll 420.

The location where the wire roll 420 is disposed may be, for example, the upper portion of the inner space of the housing 100, but it is more preferable to be disposed at the lower portion of the inner space of the housing 100 in order to prevent interference with movement of the support 200.

When the wire roll 420 is provided at the lower portion of the inner space of the housing 100, the pulley roll 430 is further provided to move the support 200 up as the wire 410 is wound.

In other words, the wire 410 is connected to the lower portion of the support 200, the pulley roll 430 is disposed at the upper portion of the inner space of the housing 100 such that the wire 410 is bent, and the wire 410 is wound around the wire roll 420 provided at the lower portion of the inner space of the housing 100, thereby moving the support 200 up.

Thus, at the upper portion of the inner space of the housing 100, only the small-volume pulley roll 430 is provided, and at the spacious lower portion of the inner space of the housing 100, the wire roll 420 is provided, which helps the support 200 to be moved up and down while preventing the interference from occurring when the support 200 is moved up or down.

The rack gear 111 is provided at a side of the inner space of the housing 100 to be vertically long and is coupled to a reducer 440 provided at a side of the support 200.

With the reducer 440 and the rack gear 111, it is possible to prevent the support 200 from being moved up or down at an excessively high speed, thereby preventing various damage or injury to a user.

The rack gear 111 may be disposed on a rail 110 to be described below, or may be disposed separately from the rail 110. However, it is more preferable to install the rack gear on the rail 110 so as to increase space utilization.

Figure 7:
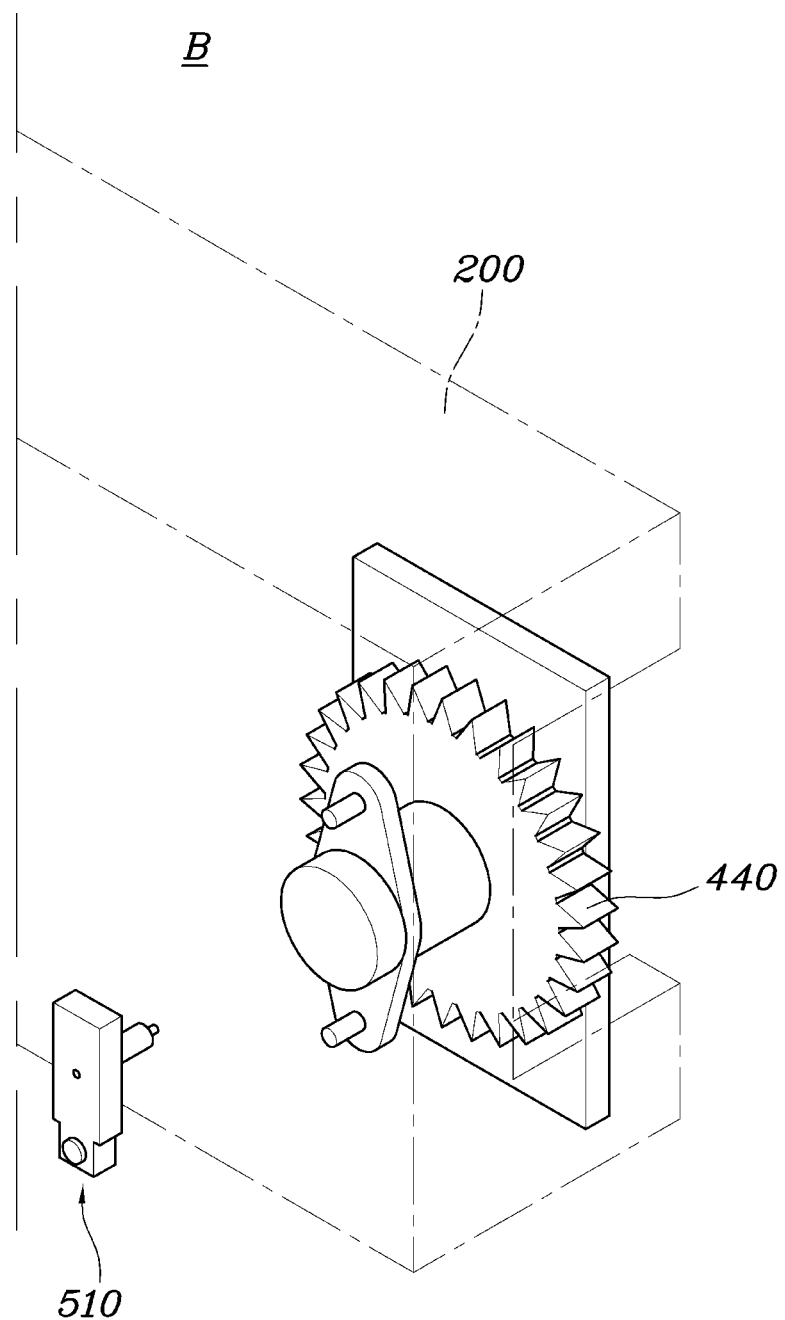
FIG. 7 is a view showing portion B of FIG. 4.
Figure 8:
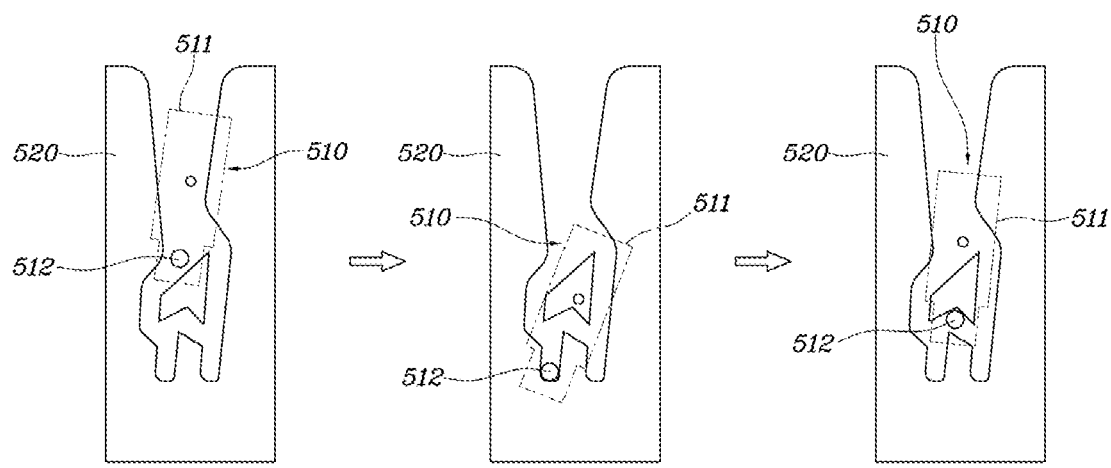
FIGS. 8 and 9 are views showing coupling/release of a locking pin and a casing.
Figure 9:
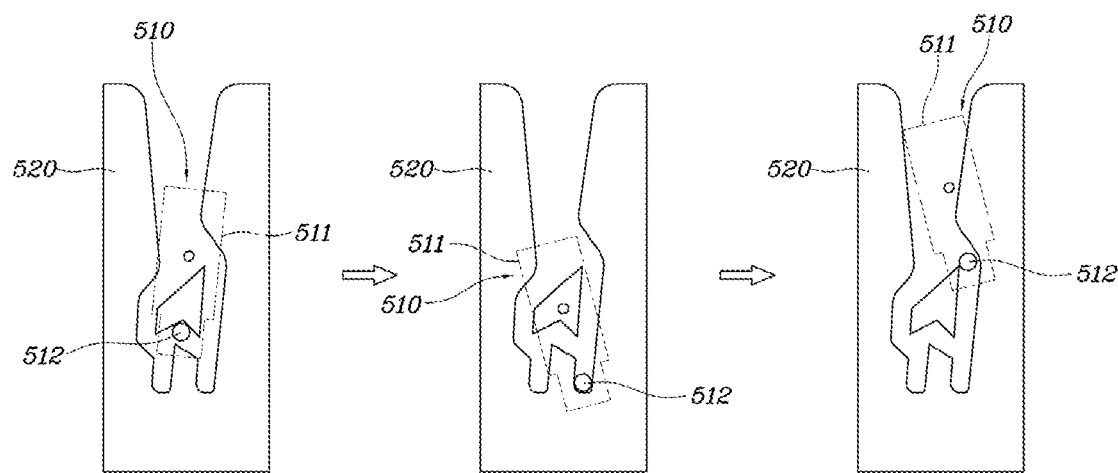

Meanwhile, when the support 200 is fully accommodated in the inner space of the housing 100, a fastening structure is required to prevent the support 200 from being separated from the inner space of the housing 100. In FIG. 7, of the fastening structure, a locking pin 510 is shown, and in FIGS. 8 and 9, a coupling structure of the locking pin 510 and a casing 520 is shown. As shown in FIGS. 8 and 9, it is preferred that the locking pin 510 is provided at a lower end of the support 200, and the locking pin 510 is coupled to the casing 520 at a lower portion of the inner space of the housing 100 into a push latch structure.

The "push-latch" structure is a structure that locks two configurations by performing a pushing operation once, and then unlocks the same by performing the pushing operation once again.

The locking pin 510 includes a main body 511 rotatably coupled to the support 200, and a pin 512 locked to the main body 511 to perform a latch function by being inserted into the casing 520.

As shown in FIG. 8, as the pin 512 is brought into contact with a protruding portion and a bent portion famed in the casing 520, the main body 511 can be rotated, and by performing a pushing operation, the pin 512 is inserted into the left lower end of the casing 520 and inserted into a center groove, thereby being locked so as not to be moved up.

As shown in FIG. 9, by performing the pushing operation again, the pin 512 is separated from the center groove of the casing 520 and inserted into the right lower end thereof, and then when releasing the pushing operation, the pin is separated from the casing 520, thereby being unlocked.

As shown in FIGS. 4 and 5, in the inner space of the housing 100, the rail 110 may be provided to guide ascent and descent of the support 200. The rail 110 is provided to prevent the support 200 from being separated in a lateral direction during ascent and descent thereof. An upper end portion of the rail 110 is famed with an insertion groove, and the role of the insertion groove will be described below.

Figure 10:
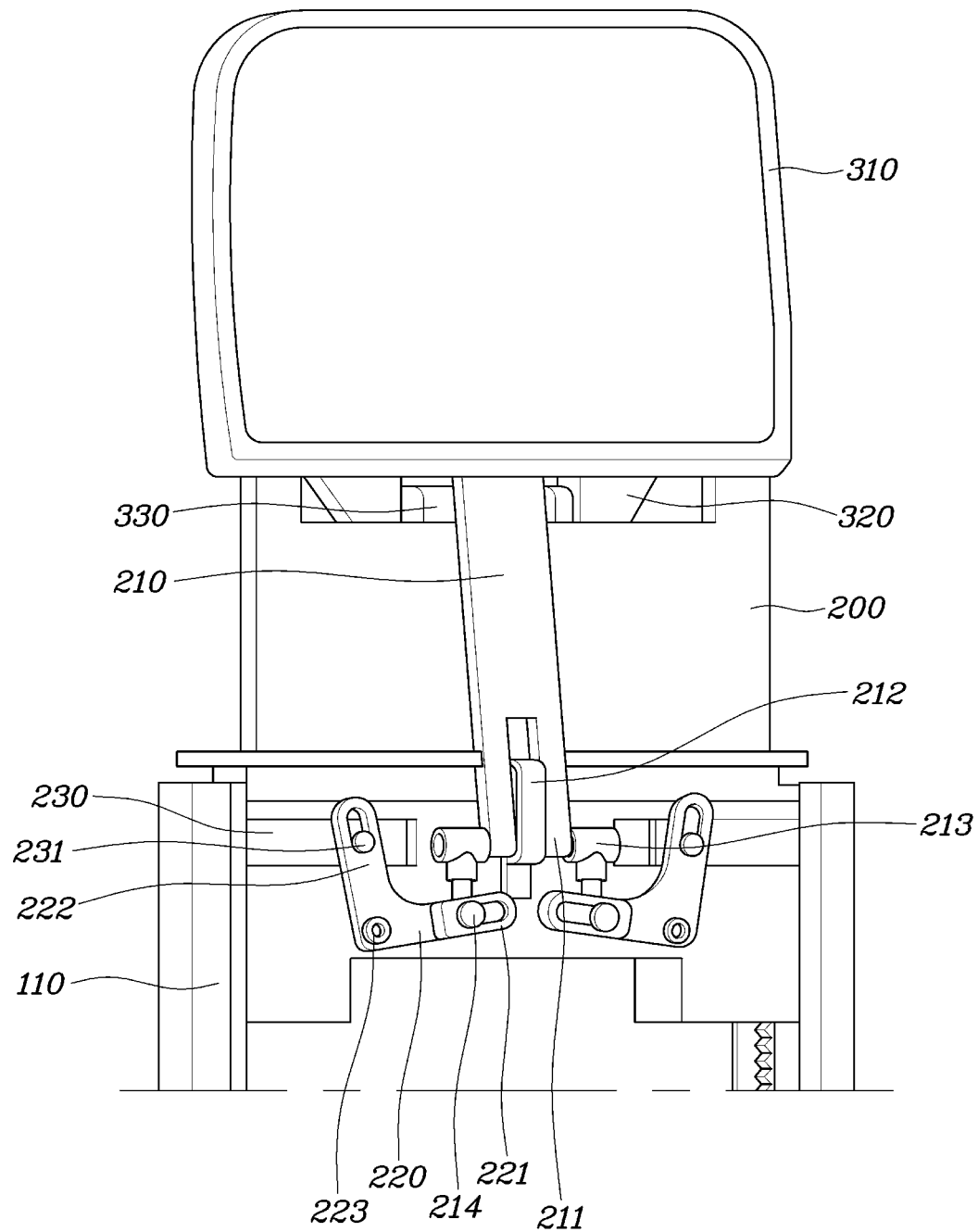
FIGS. 10 and 11 are views showing folded/unfolded states of the table part.
Figure 11:
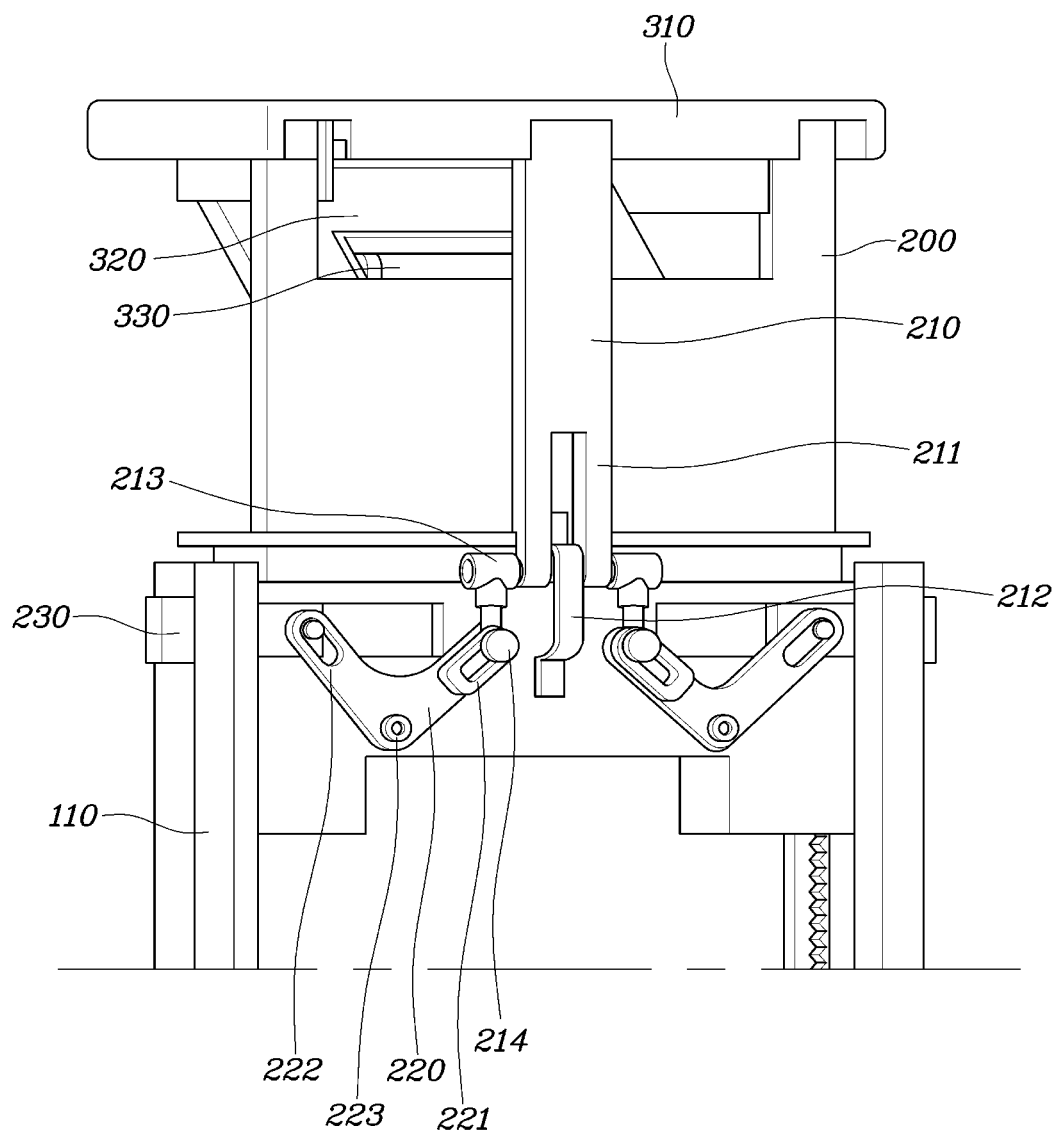

FIGS. 10 and 11 are views showing the folded state and the unfolded state of the table part 300, respectively. As shown in FIGS. 4, 5, 10, and 11, the table part 300 includes a table board 310, a first link 210, a second link 220, and a locking bar 230, and may further include a first support link 320, and a second support link 330 to enhance structural rigidity.

The table board 310 is a board that forms a plane by the unfolding action, and serves as a top plate of the table. The table board 310 is hinged to the support 200 on a lower surface of a side thereof such that in the folded state, the table board is erected at an angle similar to support 200 to be accommodated in the inner space of the housing 100, and in the unfolded state, a display or props are accommodated on the table board.

An upper end of the first link 210 is hinged to a side surface of the table board 310. Here, a location where the table board 310 and the first link 210 are hinged to each other is disposed at a location closer to one end of the table board 310 than a location where the table board 310 and the support 200 are hinged to each other.

Accordingly, when the table board 310 is rotated about the hinge position with the support 200, the hinge portion of the first link 210 and the table board 310 can be moved up and down in an arc shape.

A lower end 211 of the first link 210 is constrained in a lifting rail 212 provided in the support 200, wherein the lifting rail 212 is famed to have an oblong slot-shaped hole, and the hole is formed to have a width wider than a thickness of the lower end of the first link 210.

Accordingly, when the first link 210 is moved up or down according to the rotation of the table board 310, the first link 210 is prevented from being separated by a predetermined distance from the support 200 while the elevation range thereof is limited, and even if the angle of the first link 210 changes according to the rotation of the table board 310, the interference due to the change can be prevented.

At the lower end 211 of the first link 210, a link load 213 is provided, wherein the link load 213 is rotatably coupled to the lower end 211 of the first link 210 so that the link load 213 can maintain a predetermined angle even if the first link 210 is rotated together with the rotation of the table board 310.

The second link 220 is famed in an L-shape, and is configured such that a center portion 223 thereof, which is an L-shaped bent portion, is rotatably coupled to the support 200.

A first end 221 of the second link 220 is connected to the first link 210, and more specifically, is rotatably connected to the link load 213.

Here, the first end 221 of the second link 220 is foiled with a slot-shaped hole, and the link load 213 is provided with a protruding portion 214 engaged with the hole (i.e., "first hole") formed at the first end 221 of the second link 220.

Accordingly, when the link load 213 is moved up or down as the first link 210 is moved up or down, the first end 221 of the second link 220 connected to the link load 213 is rotated, whereby the protruding portion 214 of the link load 213 is moved along the first hole formed at the first end 221 of the second link 220.

Meanwhile, the locking bar 230 is rotatably coupled to a second end 222 of the second link 220. The second end 222 of the second link 220 is also formed with a slot-shaped hole, and a protruding portion 231 provided in the locking bar 230 is engaged with the hole (i.e., "second hole").

Accordingly, when the first end 221 of the second link 220 is rotated along with the ascent or descent of the first link 210, the second end 222 of the second link 220 is rotated and moves the locking bar 230 in a lateral direction. The locking bar 230 protrudes to opposite sides of the support 200 to be inserted in the insertion groove formed in the rail 110, and locks the support 200 and the table part 300 to prevent the same from being moved down to the inner space of the housing 100.

In summary, when the table board 310 of the table part 300 is rotated in the unfolded state, the first link 210, the second link 220, and the locking bar 230 are rotated and moved simultaneously in conjunction therewith, whereby the locking bar 230 is inserted in the insertion groove of the rail 110, thereby preventing both the support 200 and the table part 300 from being moved down. On the contrary, when the table board 310 is rotated in the folded state, the first link 210, the second link 220, and the locking bar 230 are rotated and moved simultaneously in conjunction therewith, whereby the locking bar 230 is separated from the insertion groove of the rail 110, and the support 200 and the table part 300 can be inserted into the inner space of the housing 100.

With this structure, after the support 200 and the table part 300 are taken out of the housing 100, they can be stably supported.

Meanwhile, to improve the support rigidity when the table board 310 is in the unfolded state, the first support link 320 and the second support link 330 may be provided.

The table board 310 is provided with a sliding rail 311 on a lower surface thereof, wherein the sliding rail 311 is formed to be long in a direction from the first end of the table board 310 toward the second end thereof, and preferably, two sliding rails are provided in parallel with each other with the first support link 320 disposed therebetween.

The first support link 320 is rotatably hinged to the sliding rail 311 at opposite sides of the upper end thereof to be rotatable while being moved from side to side of the table board 310.

The lower end of the first support link 320 is hinged to the support 200 to form an inclined surface between the lower surface of the table board 310 and the support 200, whereby it is possible to distribute the load applied on the table board 310 to the support 200.

Meanwhile, a center portion of the first support link 320 is famed with an open space, and a structure for hinge coupling is formed in the open space.

The second support link 330, which is a structure that supports the first support link 320 to further distribute the load, is configured such that an upper end thereof is inserted in the open space provided in the center portion of the first support link 320 to be hinged to the upper end of the second support link 330 and the center portion of the first support link 320.

The lower end of the second support link 330 is hinged to the support 200 such that the load applied to the table board 310 is transmitted thereto through the first support link 320 and distributed to the support 200.

In other words, the load applied to the table board 310 can be distributed directly to the support 200 through the first support link 320, and can be distributed to the support 200 through the second support link 330 connected to the center portion of the first support link 320 simultaneously. Since the load can be distributed in this way, even if a heavy object such as a notebook or a tablet is loaded on the table board 310, it is possible to stably support the object.

Here, it is preferred that the first support link 320 and the support 200 are hinged to each other at a location higher than a location where the second support link 330 and the support 200 are hinged to each other.

By differentiating the height of the location where the first support link 320 and the support 200 are hinged and the height of the location where the second support link 330 and the support 200 are hinged, the load applied to the table board 310 can be evenly distributed to the first support link 320 and the second support link 330, and it is possible to prevent interference between the first support link 320 and the second support link 330 when the table board 310 is rotated in the unfolded and folded states.

Figure 12:
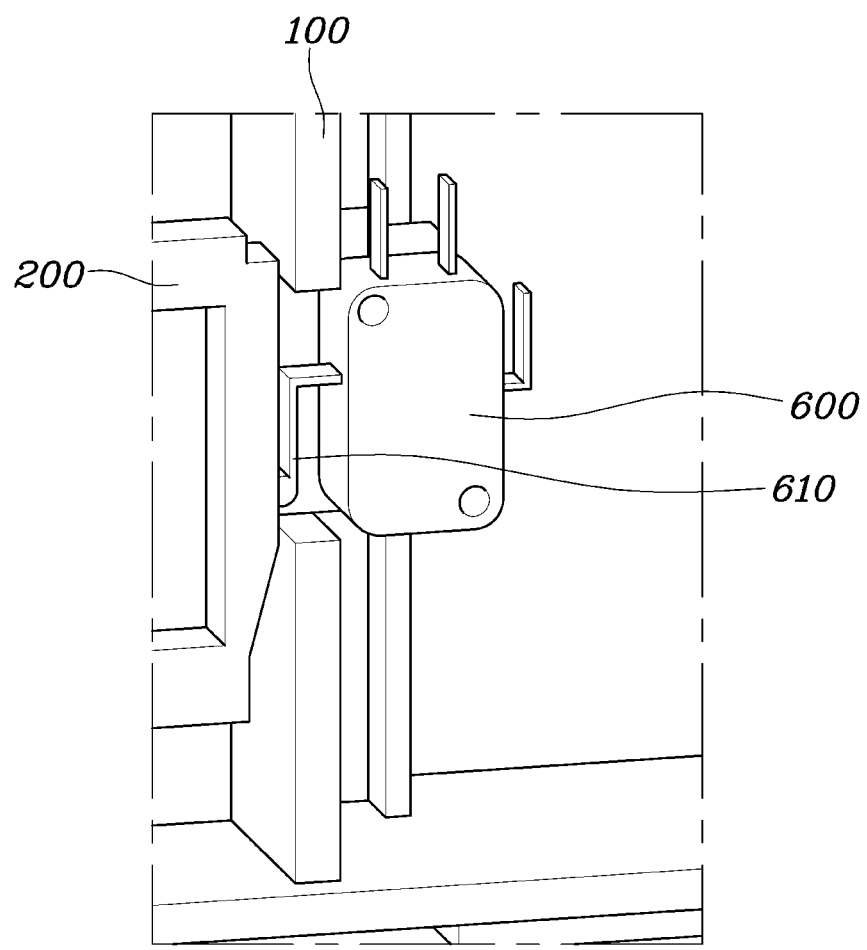
FIGS. 12 and 13 are views showing contact/release states of a limit sensor.
Figure 13:
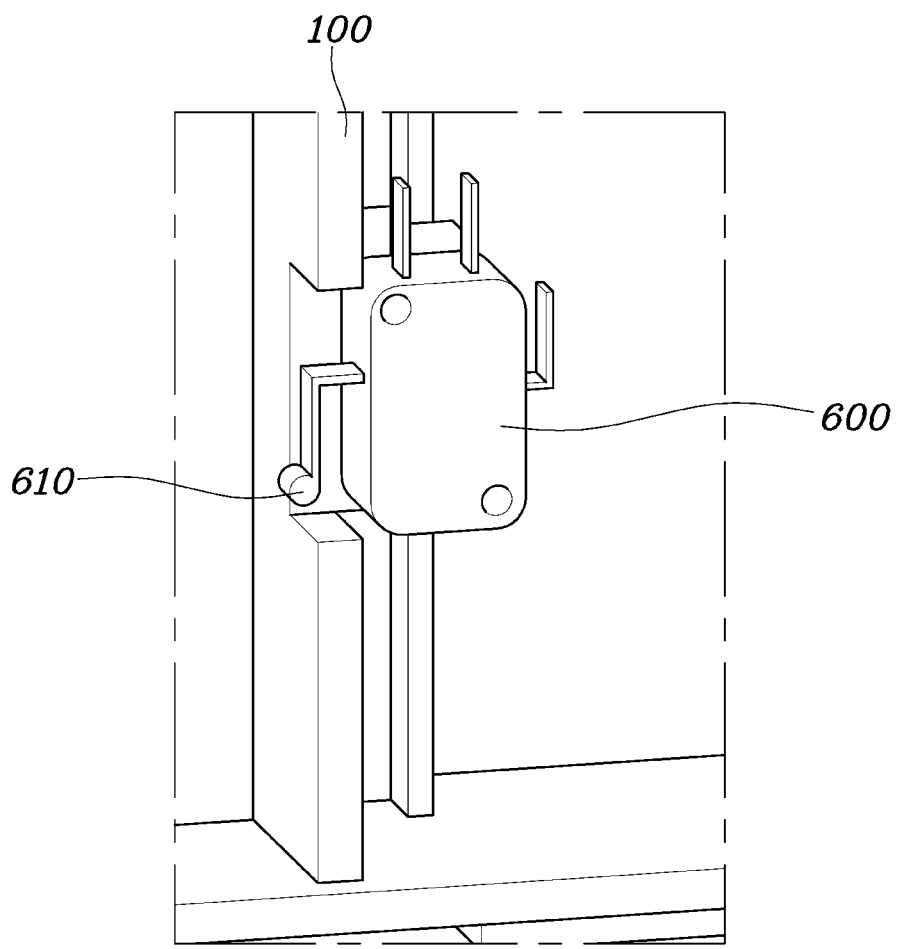
Figure 14:
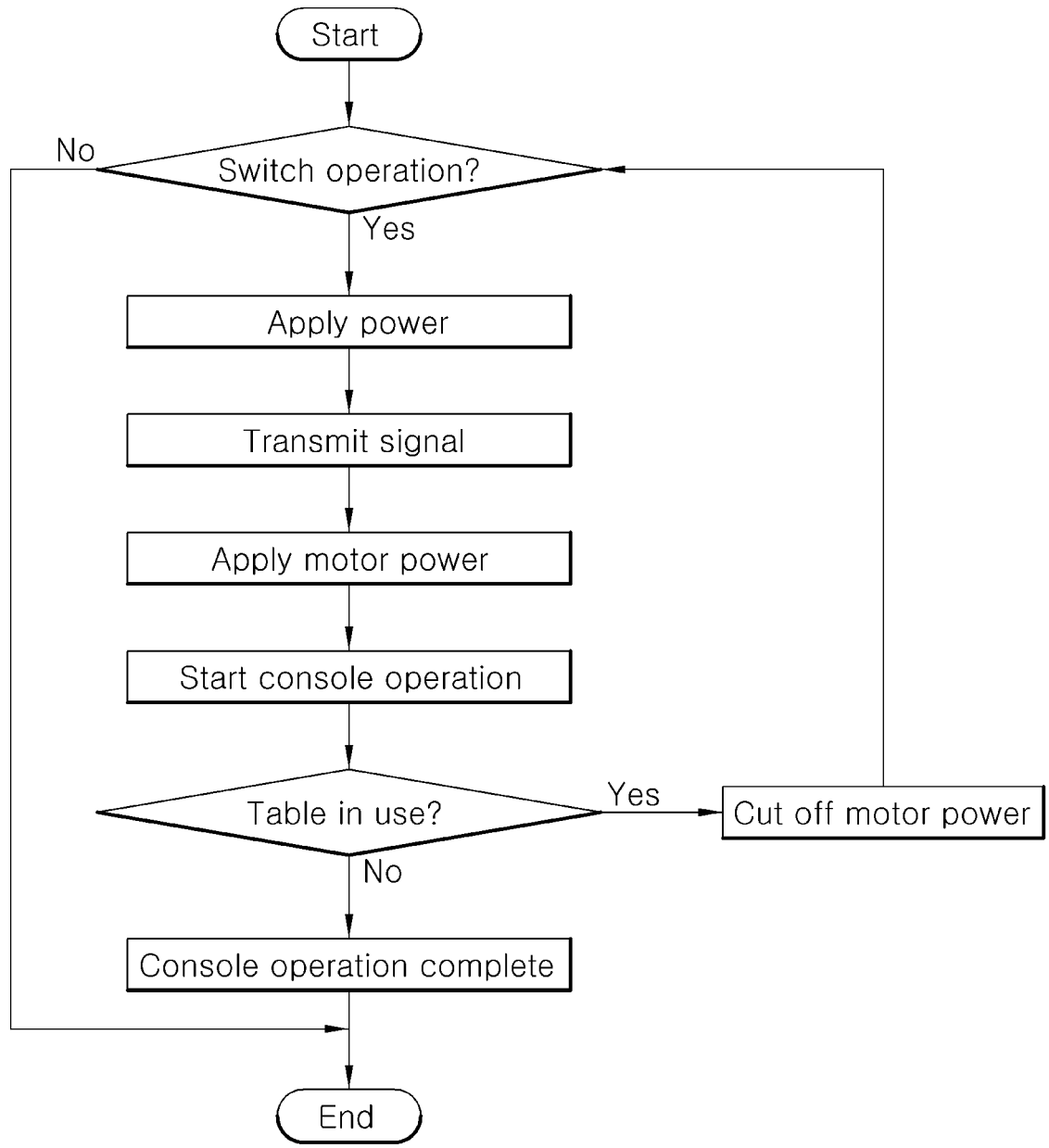
FIG. 14 is a flowchart showing a process of controlling the operation of the console apparatus according to the contact of the limit sensor.

FIGS. 12 and 13 are views showing contact/release states of a limit sensor; and FIG. 14 is a flowchart showing a process of controlling the operation of the console apparatus according to the contact of the limit sensor.

As shown in FIGS. 12 and 13, at the lower portion of the inner space of the housing 100, and more specifically, at the lower end portion of the rail 110, a limit sensor 600 may be provided. The limit sensor 600 includes a contact sensor 610, and the contact sensor 610 selectively comes into contact with a side surface of the support 200, thereby sensing the position of the support 200.

To be more specific, when the support 200 is fully accommodated in the inner space of the housing 100, the side surface of the support 200 and the contact sensor 610 come into contact with each other and the limit sensor 600 can send a signal indicating that the support 200 is received. On the contrary, when the support 200 is pulled out of the inner space of the housing 100 and the table is in use, the contact sensor 610 does not come into contact with the support 200 and the limit sensor 600 can send a signal indicating that the support 200 is pulled out and the table is in use.

As shown in FIGS. 12 to 14, when a user activates a switch to move the console apparatus, 12V power is applied from a battery to transmit an operating signal to a controller, whereby the power is applied to a motor that moves a console apparatus, and the console apparatus starts to move.

Here, when the signal indicating that the table is in use is generated as the support 200 does not come into contact with the limit sensor 600, the power of the motor is cut off and the movement of the console apparatus is stopped. After that, when the table is received by the user and the signal indicating storage state is generated as the support 200 comes into contact with the limit sensor 600, the console apparatus is allowed to move and the console apparatus can be moved to a desired position.

This determination procedure is performed to allow movement of the console apparatus only when the support 200 is accommodated in the inner space of the housing 100, thereby preventing the table part 300 and the support 200 from being damaged by the crash board when the console apparatus moves to the lower portion of the crash board.

Meanwhile, as shown in FIGS. 1 and 3, The support 200, the table part 300, and the lifting part 400 described above may be configured such that a pair of each thereof is provided in the inner space of the housing 100 and two table boards 310 are unfolded to become one table. Further, a cover may be provided to cover the open upper portion of the inner space of the housing 100.

Hereinbelow, description will be made to the operation of the console apparatus with a variable table.

Firstly, both the support 200 and the table part 300 are accommodated in the inner space of the housing 100, and in the state where the locking pin 510 disposed at the lower end of the support 200 is locked to the casing 520 provided at the lower portion of the housing 100, the user separates the locking pin 510 from the casing 520 by pushing the upper side of the table part 300 downward.

Then, the support 200 and table part 300 are moved up by the force of winding the wire 410 on the wire roll 420. Here, the tensile force generated as the wire 410 is wound is preferably equal to or similar to the weight of the support 200 and the table part 300. This allows the user to minimize the force that must be applied when withdrawing the table part 300 and the support 200.

Further, the reducer 440 provided in the support 200 is engaged with the rack gear provided in the inner space of the housing 100 so as to limit the speed to a predetermined level or less when the user withdraws the support 200 and the table part 300 with too much force.

After the support 200 and the table part 300 are fully withdrawn, the user transforms the table board 310 from the folded state to the unfolded state. In other words, the user grabs and laterally rotates the upper end of the table board 310 to transform the same to serve as a top plate of the table.

Accordingly, as the first link 210, the second link 220, and the locking bar 230 linked to the table board 310 are rotated and moved, the locking bar 230 is inserted in the insertion groove formed in the rail 110, and the support 200 and the table part 300 are prevented from being inserted in the inner space of the housing 100.

In the unfolded state of the table board 310, for the user to transform the table board 310 into the folded state, the locking bar 230 is separated from the insertion groove formed in the rail 110 as the first link 210, the second link 220, and the locking bar 230 linked to the table board 310 are rotated and moved. After that, the user inserts the support 200 and the table part 300 in the inner space of the housing 100, and the locking pin 510 provided at the lower end of the support 200 is locked to the casing 52, whereby the support 200 and the table part 300 are prevented from being withdrawn from the inner space of the housing 100.

Although certain embodiments of the present disclosure has been described for illustrative purposes, those skilled in the art will appreciate that various modifications, additions and substitutions are possible, without departing from the scope and spirit of the disclosure as disclosed in the accompanying claims.

Therefore, embodiments of the present disclosure have been described merely for illustrative purposes, and should not be construed as being limiting. The scope of the present disclosure is defined by the accompanying claims rather than the description which is presented above. Moreover, the present disclosure is intended to cover not only the exemplary embodiments, but also various alternatives, modifications, equivalents and other embodiments that may be included within the spirit and scope of the present disclosure as defined by the appended claims.

What is claimed is:

1. A console apparatus with a variable table provided in a vehicle, the console apparatus comprising:
   a housing having an inner space with an open upper portion;
   a support configured to be vertically movable in the inner space of the housing;
   a table part rotatably connected to an upper end of the support; and
   a lifting part disposed in the housing and configured to fix a position of the support or adjust a speed of the support when the support is moved up or down,
   wherein the table part includes:
      a table board hinged to the upper end of the support;
      a first link having an upper end hinged to the table board and a lower end vertically movably coupled to the support;
      a second link having a center portion rotatably coupled to the support around a first axis and a first end rotatably connected to the first link, the second link being formed with a slot-shaped hole at each of opposite ends of the second link;
      a locking bar rotatably coupled to a second end of the second link, the locking bar being engaged with a second hole formed in the second end of the second link; and
      a link rod rotatably coupled to the lower end of the first link around a second axis, the link rod being engaged with a first hole formed in the first end of the second link.

2. The console apparatus of claim 1, wherein the lifting part includes:
   a wire connected to the support; and
   a wire roll disposed in the inner space of the housing and configured to allow the wire to be wound therearound and to provide a tensile force to the wire,
   wherein, when the support is moved up, the wire winds around the wire roll, and when the support is moved down, the wire releases from the wire roll.

3. The console apparatus of claim 2, wherein
   the lifting part further includes a pulley roll disposed at an upper portion of the inner space of the housing and configured to support the wire when the wire is bent,
   the wire roll is disposed at a lower portion of the inner space of the housing, and
   the wire is connected to a lower portion of the support.

4. The console apparatus of claim 2, wherein the wire roll includes:
   a shaft connected to the housing;
   a holder rotatably coupled to the shaft and configured such that the wire is wound around an outer circumferential surface thereof; and
   an elastic body configured to press the holder in a winding direction of the wire.

5. The console apparatus of claim 4, wherein the elastic body is a spiral spring.

6. The console apparatus of claim 2, wherein
   the lifting part further includes a rack gear vertically disposed in the inner space of the housing, and
   the support includes a reducer engaged with the rack gear and configured to adjust an ascent speed and a descent speed of the support.

7. The console apparatus of claim 1, wherein
   the support includes a locking pin disposed at a lower end thereof, and
   the locking pin is reversibly coupled to a casing in a push-latch structure, the casing being disposed at a lower portion of the inner space of the housing.

8. The console apparatus of claim 7, wherein the locking pin includes a main body rotatably coupled to the support and further includes a pin locked to the main body and inserted into the casing.

9. The console apparatus of claim 1, further comprising:
   a rail vertically disposed in the inner space of the housing, including an insertion groove disposed at an upper end portion of the rail, and configured to guide an ascent and a descent of the support,
   wherein the table part further includes:
      the table board including a pair of parallel sliding rails disposed on a lower surface of the table board;
      the first link configured to move up or down according to a rotation of the table part;
      the second link formed in an L-shape; and
      the locking bar configured to protrude toward opposite sides of the support according to a rotation of the second link so as to be inserted into the insertion groove of the rail.

10. The console apparatus of claim 9, further comprising:
    a limit sensor disposed in a lower end portion of the rail,
    wherein the limit sensor is configured to sense the position of the support by selectively coming into contact with the support.

11. The console apparatus of claim 9, wherein:
    the table board further includes:
       a first support link having an upper end hinged to the sliding rails to be rotatable and slidable relative to the sliding rails; and
       a second support link is configured to mediate between a center portion of the first support link and the support.

12. The console apparatus of claim 11, wherein the first support link and the support are hinged to each other at a location higher than a location where the second link and the support are hinged to each other.

13. The console apparatus of claim 11, wherein
    the center portion of the first support link is open,
    an upper end of the second support link is inserted into the open center portion of the first support link, and
    the first support link and the second support link are hinged to each other.

* * * * *